(12) United States Patent
Kurotobi et al.

(10) Patent No.: US 11,161,565 B2
(45) Date of Patent: Nov. 2, 2021

(54) BICYCLE CONTROL DEVICE AND BICYCLE ELECTRIC ASSIST UNIT INCLUDING BICYCLE CONTROL DEVICE

(71) Applicant: Shimano Inc., Osaka (JP)

(72) Inventors: Tadaharu Kurotobi, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 20 days.

(21) Appl. No.: 15/641,744

(22) Filed: Jul. 5, 2017

(65) Prior Publication Data

US 2018/0037294 A1 Feb. 8, 2018

(30) Foreign Application Priority Data

Aug. 5, 2016 (JP) .............................. JP2016-154920
Mar. 31, 2017 (JP) .............................. JP2017-071829

(51) Int. Cl.
| | |
|---|---|
| *B62K 25/04* | (2006.01) |
| *B62J 1/10* | (2006.01) |
| *B62K 25/30* | (2006.01) |
| *B62K 25/28* | (2006.01) |
| *B62K 25/08* | (2006.01) |
| *B62J 1/08* | (2006.01) |
| *B62J 45/415* | (2020.01) |
| *B62M 6/45* | (2010.01) |
| *B62M 6/55* | (2010.01) |
| *B62M 6/90* | (2010.01) |

(52) U.S. Cl.
CPC .............. *B62K 25/04* (2013.01); *B62J 1/10* (2013.01); *B62K 25/08* (2013.01); *B62K 25/286* (2013.01); *B62K 25/30* (2013.01); *B62J 45/4152* (2020.02); *B62J 2001/085* (2013.01); *B62K 2025/044* (2013.01); *B62K 2025/047* (2013.01); *B62M 6/45* (2013.01); *B62M 6/55* (2013.01); *B62M 6/90* (2013.01)

(58) Field of Classification Search
None
See application file for complete search history.

(56) References Cited

U.S. PATENT DOCUMENTS

| | | | |
|---|---|---|---|
| 6,336,648 B1 * | 1/2002 | Bohn ..................... | B62K 25/04 280/276 |
| 6,874,592 B2 * | 4/2005 | Yokotani ................. | B60L 58/15 180/206.2 |
| 8,489,277 B2 | 7/2013 | Hara et al. | |

(Continued)

FOREIGN PATENT DOCUMENTS

| | | |
|---|---|---|
| CN | 104743038 A | 7/2015 |
| DE | 202013105415 U1 | 12/2013 |

(Continued)

*Primary Examiner* — Mathew Franklin Gordon
(74) *Attorney, Agent, or Firm* — Global IP Counselors, LLP

(57) ABSTRACT

A bicycle control device is provided that allows the rider to ride a bicycle comfortably. A bicycle electric assist unit is provided that includes the bicycle control device. The bicycle control device includes an electronic controller that controls an operational state of a bicycle component based on at least an operational state of the bicycle electric assist unit. The bicycle component includes at least one of an electric suspension and an electric adjustable seatpost.

27 Claims, 7 Drawing Sheets

(56) References Cited

U.S. PATENT DOCUMENTS

| | | | |
|---|---|---|---|
| 2004/0035225 A1* | 2/2004 | Crasset | B62K 19/34 73/862.541 |
| 2007/0222170 A1* | 9/2007 | Sasnowski | B62M 6/55 280/221 |
| 2011/0257841 A1* | 10/2011 | Hara | B62K 25/04 701/37 |
| 2014/0210180 A1 | 7/2014 | Hudak | |
| 2015/0101874 A1* | 4/2015 | Getta | B62M 9/06 180/206.4 |
| 2017/0096185 A1* | 4/2017 | Hara | B62J 1/08 |
| 2017/0151997 A1* | 6/2017 | Repoulias | B62M 25/08 |

FOREIGN PATENT DOCUMENTS

| | | |
|---|---|---|
| EP | 2028098 A2 | 2/2009 |
| EP | 2 657 113 A2 | 10/2013 |
| JP | 6-144343 A | 5/1994 |
| JP | 2014-524389 A | 9/2014 |
| WO | 2014/029759 A1 | 2/2014 |

\* cited by examiner

| | | Front Electric Suspension | | | Rear Electric Suspension | | |
|---|---|---|---|---|---|---|---|
| | | Travel Amount | Moved State | Repulsion Force | Travel Amount | Movement State | Repulsion Force |
| Operation Mode | 1st Operation Mode | | Locked | | | Locked | |
| | 2nd Operation Mode | | Unlocked | | | Unlocked | |
| | 3rd Operation Mode | Controlled | | | | | |
| | | | | | Controlled | | |
| | | Small | | | Large | | |
| | | Controlled | Locked | | | Locked | |
| | | | Locked | | Controlled | Locked | |
| | | Small | Locked | | Large | Locked | |
| | | | | Controlled | | | |
| | | | | | | | Controlled |
| | | | | Small | | | Large |
| | | | Unlocked | Controlled | | Unlocked | |
| | | | Unlocked | | | Unlocked | Controlled |
| | | | Unlocked | Small | | Unlocked | Large |
| | OFF Mode | Large | | | Small | | |
| | | Large | Unlocked | | Small | Unlocked | |
| | | | | Large | | | Small |

Fig. 3

| | | Adjustable Seatpost Height |
|---|---|---|
| Operation Mode | 1st Operation Mode | 1st Range |
| | 2nd Operation Mode | 1st Range |
| | 3rd Operation Mode | 2nd Range |
| | OFF Mode | 3rd Range |

Fig. 4

BICYCLE CONTROL DEVICE AND BICYCLE ELECTRIC ASSIST UNIT INCLUDING BICYCLE CONTROL DEVICE

CROSS-REFERENCE TO RELATED APPLICATIONS

This application claims priority to Japanese Patent Application No. 2016-154920, filed on Aug. 5, 2016, and Japanese Patent Application No. 2017-071829, filed on Mar. 31, 2017. The entire disclosures of Japanese Patent Application Nos. 2016-154920 and 2017-071829 are hereby incorporated herein by reference.

BACKGROUND

Field of the Invention

The present invention relates to a bicycle control device and a bicycle electric assist unit that includes the bicycle control device.

Background Information

A known bicycle includes an electric suspension and an electric adjustable seatpost, the operational states of which are changeable. For example, U.S. Pat. No. 8,489,277 (patent document 1) describes a bicycle that switches the electric suspension between a locked state and an unlocked state and adjusts the amount of travel of the electric suspension in accordance with an operation performed on an operating unit by the rider.

SUMMARY

The needs for controlling the operational states of the electric suspension and the electric adjustable seatpost have increased so that the rider can ride a bicycle comfortably. It is an object of the present invention to provide a bicycle control device that allows the rider to ride a bicycle comfortably. It is also an object of the present invention to provide a bicycle electric assist unit that includes the bicycle control device.

In accordance with a first aspect of the invention, a bicycle control device includes an electronic controller that controls an operational state of a bicycle component based on at least an operational state of a bicycle electric assist unit. The bicycle component includes at least one of an electric suspension and an electric adjustable seatpost. The operational state of a typical bicycle electric assist unit is changed in accordance with the riding state of the bicycle. Thus, the controlling of the operational state of the bicycle component based on at least the operational state of the bicycle electric assist unit automatically changes the operational state of the bicycle component in accordance with the riding state of the bicycle. This allows the rider to ride the bicycle comfortably.

In accordance with a second aspect of the invention, in the bicycle control device according to the first aspect, the electronic controller is configured to function in an automatic control mode and a manual control mode. In the automatic control mode, the electronic controller controls the operational state of the bicycle component based on at least the operational state of the bicycle electric assist unit. This allows the rider to select the automatic control and the manual control. In the manual control mode, the operational state of the bicycle component can be manually changed.

In accordance with a third aspect of the invention, in the bicycle control device according to the second aspect, the electronic controller is configured to switch between the automatic control mode and the manual control mode based on an input from an operating unit. This allows the rider to switch between the automatic control mode and the manual control mode in accordance with the situation.

In accordance with a fourth aspect of the invention, in the bicycle control device according to any one of the first to third aspects, the bicycle component includes the electric suspension. The electronic controller is configured to control the operational state of the electric suspension. The operational state of the electric suspension is automatically changed based on the operational state of the bicycle electric assist unit. Thus, the rider can ride the bicycle comfortably.

In accordance with a fifth aspect of the invention, in the bicycle control device according to the fourth aspect, the operational state of the electric suspension includes at least one of a movement state, an amount of travel, damping force and repulsion force. The electronic controller is configured to control at least one of the movement state, the amount of travel, the damping force and the repulsion force based on the operational state of the bicycle electric assist unit. Thus, at least one of the movement state, the amount of travel, the damping force, and the repulsion force is automatically changed. This allows the rider to ride the bicycle comfortably.

In accordance with a sixth aspect of the invention, in the bicycle control device according to the fifth aspect, the operational state of the bicycle electric assist unit includes an operation mode. The electronic controller is configured to control the operational state of the electric suspension based on the operation mode. Thus, the operational state of the electric suspension is automatically changed. This allows the rider to ride the bicycle comfortably.

In accordance with a seventh aspect of the invention, in the bicycle control device according to the sixth aspect, the operation mode includes a first operation mode that assists traveling of a bicycle at a first assist ratio. The electronic controller is configured to control the electric suspension so that the movement state of the electric suspension becomes a locked state in a state where the operation mode is the first operation mode. Thus, if the bicycle electric assist unit is in the first operation mode, driving power is efficiently transmitted to the wheels of the bicycle.

In accordance with an eighth aspect of the invention, in the bicycle control device according to the seventh aspect, the operation mode includes a second operation mode that assists traveling of the bicycle at a second assist ratio. The electronic controller is configured to control the electric suspension so that the movement state of the electric suspension becomes an unlocked state in a state where the operation mode is the second operation mode. Thus, if the bicycle electric assist unit is in the second operation mode, the electric suspension absorbs shocks applied to the bicycle.

In accordance with a ninth aspect of the invention, in the bicycle control device according to the eighth aspect, the second assist ratio is greater than the first assist ratio. Thus, if the assist ratio is small, driving power is efficiently transmitted to the wheels of the bicycle. If the assist ratio is large, the electric suspension absorbs shocks applied to the bicycle.

In accordance with a tenth aspect of the invention, in the bicycle control device according to the eighth or ninth aspect, the electric suspension includes a front electric suspension and a rear electric suspension. The operation mode includes a third operation mode that assists traveling of the bicycle at a third assist ratio. The electronic controller is configured to control the front electric suspension and the rear electric suspension in a state where the operation mode of the bicycle electric assist unit is the third operation mode. Thus, the operational states of the front electric suspension and the rear electric suspension are automatically changed in accordance with the riding state of the bicycle.

In accordance with an eleventh aspect of the invention, in the bicycle control device according to the tenth aspect, the third assist ratio is greater than the first assist ratio. Thus, if the assist ratio is relatively large, the operational states of the front electric suspension and the rear electric suspension are automatically changed in accordance with the riding state of the bicycle.

In accordance with a twelfth aspect of the invention, in the bicycle control device according to the eleventh aspect, the third assist ratio is greater than the second assist ratio. Thus, if the assist ratio is large, the operational states of the front electric suspension and the rear electric suspension are automatically changed in accordance with the riding state of the bicycle.

In accordance with a thirteenth aspect of the invention, in the bicycle control device according to any one of the tenth to twelfth aspects, the electronic controller is configured to control at least one of the front electric suspension and the rear electric suspension to change an amount of travel. Thus, the amount of travel of the electric suspension is automatically changed in accordance with the riding state of the bicycle.

In accordance with a fourteenth aspect of the invention, in the bicycle control device according to the thirteenth aspect, the electronic controller is configured to control at least one of the front electric suspension and the rear electric suspension so that the amount of travel of the rear electric suspension is larger than the amount of travel of the front electric suspension. If the rider is riding the bicycle on an uphill slope, the assist ratio is increased. If the assist ratio is large, the amount of travel of the rear electric suspension is set to be larger than the amount of travel of the front electric suspension. This allows the rider to take a riding stance that is appropriate for an uphill slope.

In accordance with a fifteenth aspect of the invention, in the bicycle control device according to the thirteenth or fourteenth aspect, the electronic controller is configured to control the front electric suspension and the rear electric suspension so that the movement state of each of the front electric suspension and the rear electric suspension is changed to a locked state. If the rider is riding the bicycle on an uphill slope, the assist ratio is increased. If the assist ratio is large, the rear electric suspension and the front electric suspension are locked in the movement state. This allows driving power to be efficiently transmitted to the wheels of the bicycle if the rider is riding the bicycle on the uphill slope.

In accordance with a sixteenth aspect of the invention, in the bicycle control device according to any one of the tenth to twelfth aspects, the electronic controller is configured to control at least one of the front electric suspension and the rear electric suspension to control repulsion force. Thus, the repulsion force of the electric suspension is automatically changed in accordance with the riding state of the bicycle.

In accordance with a seventeenth aspect of the invention, in the bicycle control device according to the sixteenth aspect, the electronic controller is configured to control at least one of the front electric suspension and the rear electric suspension so that the repulsion force of the rear electric suspension is larger than the repulsion force of the front electric suspension. If the rider is riding the bicycle on an uphill slope, the assist ratio is increased. If the assist ratio is large, the repulsion force of the rear electric suspension is set to be larger than the repulsion force of the front electric suspension. This allows the rider to take a riding stance that is appropriate for an uphill slope.

In accordance with an eighteenth aspect of the invention, in the bicycle control device according to the seventeenth aspect, the electronic controller is configured to control the electric suspension so that the movement state of the electric suspension becomes an unlocked state. If the rider is riding the bicycle on an uphill slope, the assist ratio is increased. If the assist ratio is large, the electric suspension is unlocked from the movement state. Thus, the electric suspension absorbs shocks applied to the bicycle if the rider is riding the bicycle on the uphill slope.

In accordance with a nineteenth aspect of the invention, in the bicycle control device according to any one of the first to third aspects, the bicycle component includes the electric adjustable seatpost. The electronic controller is configured to control the operational state of the electric adjustable seatpost. Thus, the operational state of the electric adjustable seatpost is automatically changed in accordance with the riding state of the bicycle.

In accordance with a twentieth aspect of the invention, in the bicycle control device according to the nineteenth aspect, the operational state of the electric adjustable seatpost includes a height of the electric adjustable seatpost. The electronic controller is configured to control the height of the electric adjustable seatpost based on the operational state of the bicycle electric assist unit. Thus, the height of the electric adjustable seatpost is automatically changed in accordance with the riding state of the bicycle.

In accordance with a twenty-first aspect of the invention, in the bicycle control device according to the nineteenth or twentieth aspect, the operational state of the bicycle electric assist unit includes an operation mode. The electronic controller is configured to control the operational state of the electric adjustable seatpost based on the operation mode. Thus, the height of the electric adjustable seatpost is automatically changed in accordance with the riding state of the bicycle.

In accordance with a twenty-second aspect of the invention, in the bicycle control device according to the twenty-first aspect, the operation mode includes a first operation mode that assists traveling of a bicycle at a first assist ratio and a third operation mode that assists traveling of the bicycle at a third assist ratio that is greater than the first assist ratio. The electronic controller is configured to control the electric adjustable seatpost so that a height of the electric adjustable seatpost is included in a first range in a state where the operation mode is the first operation mode. The electronic controller is configured to control the electric adjustable seatpost so that the height of the electric adjustable seatpost is included in a second range that is higher than the first range in a state where the operation mode is the third operation mode. If the electric adjustable seatpost is located at a high position, it is easy for the rider to take a forward leaning stance. If the electric adjustable seatpost is located at a low position, it is easy for the rider to take a rearward leaning stance. If the electric adjustable seatpost is located at a middle position, it is easy for the rider to take a normal riding stance. Thus, if riding the bicycle on an uphill slope, it is easy for the rider to take a forward leaning stance. If riding on a level road, it is easy for the rider to take a normal riding stance.

In accordance with a twenty-third aspect of the invention, in the bicycle control device according to the twenty-second aspect, the operation mode includes a second operation mode that assists traveling of the bicycle at a second assist ratio. The second assist ratio is greater than the first assist ratio and less than the third assist ratio. The electronic controller is configured to control the electric adjustable seatpost so that the height of the electric adjustable seatpost is included in the first range in a state where the operation mode is the second operation mode. Thus, if the assist ratio is the second assist ratio, the rider can take a stance that allows the rider to easily apply pedaling force to the cranks.

In accordance with a twenty-fourth aspect of the invention, in the bicycle control device according to any one of the first to twenty-third aspects, the electric adjustable seatpost includes a stationary tube, a movable tube to which a seat is coupled, and a biasing mechanism that biases the movable tube relative to the stationary tube in an extension direction and fixes the movable tube to any position. The operational state of the electric adjustable seatpost includes a fixed state in which the movable tube is fixed to the stationary tube and a movable state in which the movable tube is movable relative to the stationary tube. The electronic controller is configured to switch the operational state of the electric adjustable seatpost based on the operation mode. Thus, the biasing mechanism is used to fix the seat to an appropriate position.

In accordance with a twenty-fifth aspect of the invention, in the bicycle control device according to the twenty-fourth aspect, the biasing mechanism biases the movable tube with at least one of air pressure and hydraulic pressure. Thus, the biasing means of the biasing mechanism can be selected.

In accordance with a twenty-sixth aspect of the invention, in the bicycle control device according to the twenty-fourth or twenty-fifth aspect, the electronic controller is configured to switch the operational state of the electric adjustable seatpost to the movable state in a state upon the electronic controller determining that force applied to the movable tube is less than or equal to a predetermined value. Thus, the seat is released from the fixed state by reducing force applied to the electric adjustable seatpost.

In accordance with a twenty-seventh aspect of the invention, in the bicycle control device according to any one of the first to twenty-sixth aspects, the electronic controller is configured to control the operational state of the bicycle component based on an operation mode of the bicycle electric assist unit and at least one of a detection result of an inclination sensor that detects an inclination of a bicycle, a detection result of a power meter that detects drive power of the bicycle, and a detection result of a rotational speed sensor that detects a rotational speed of a wheel of the bicycle. Thus, the operational state of the bicycle component is further specifically controlled in accordance with the riding state of the bicycle.

In accordance with a twenty-eighth aspect of the invention, a bicycle electric assist unit includes the bicycle control device according to any one of the first to twenty-seventh aspects.

Accordingly, the bicycle control device and the bicycle electric assist unit including the bicycle control device allow the rider to ride a bicycle comfortably.

BRIEF DESCRIPTION OF THE DRAWINGS

Referring now to the attached drawings which form a part of this original disclosure.

FIG. 3 is a first chart of a first map stored in advance in memory of the bicycle control device illustrated in FIGS. 1 and 2.

FIG. 4 is a second chart of a second map in advance stored in the bicycle control device illustrated in FIGS. 1 and 2.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
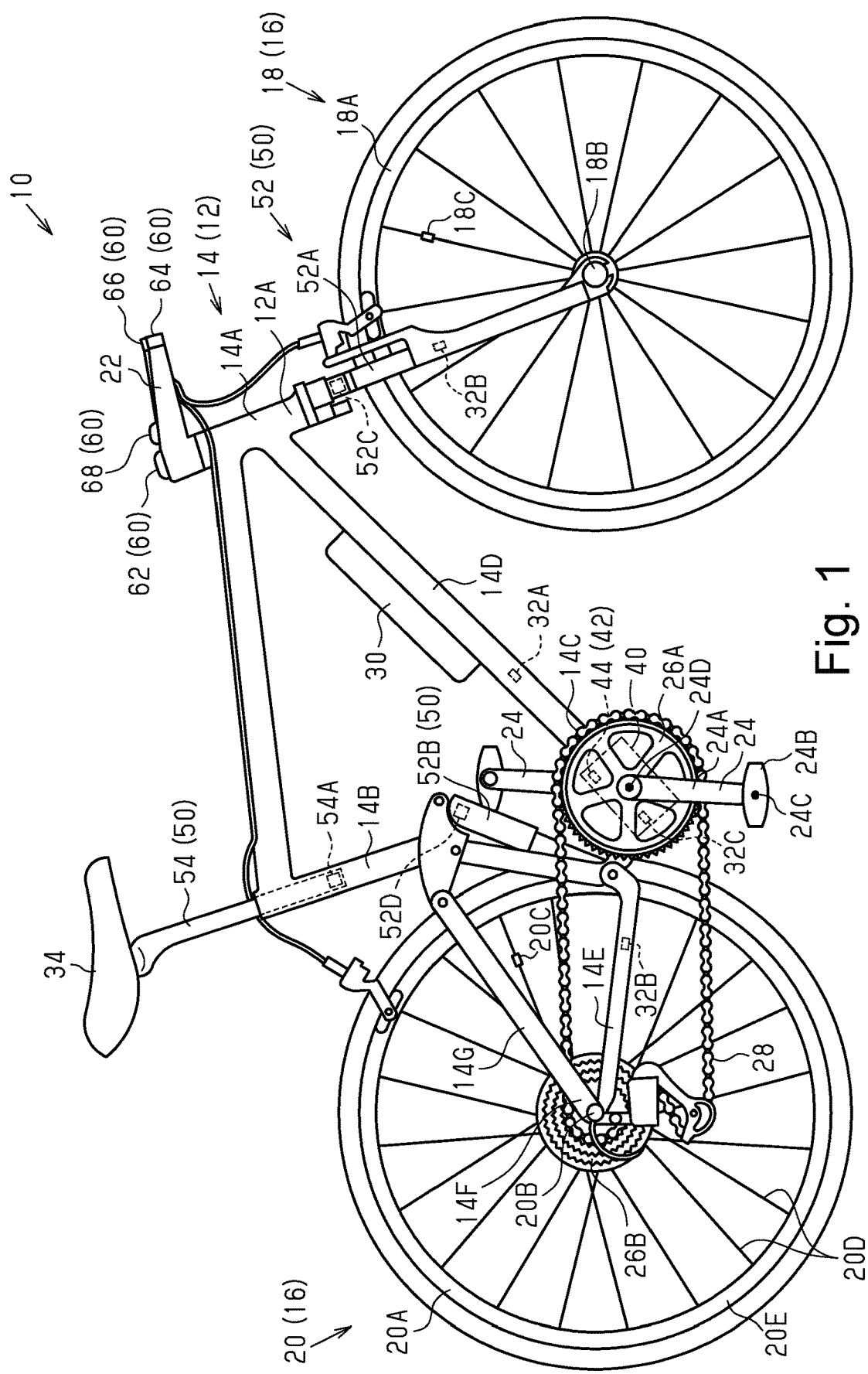
FIG. 1 is a side elevational view of a bicycle equipped with a bicycle control device in accordance with a first embodiment.

As shown in FIG. 1, a bicycle 10 includes a bicycle body 12, a pair of wheels 16, a handlebar 22, a pair of cranks 24, a front sprocket 26A, a rear sprocket 26B, a chain 28, a battery 30, a seat 34, a bicycle electric assist unit 40 (hereafter referred to as "the electric assist unit 40"), and a plurality of bicycle components 50. The electric assist unit 40 includes a bicycle control device 42 (hereafter referred to as "the control device 42"). The bicycle components 50 include at least one of an electric suspension 52 and an electric adjustable seatpost 54. The seat 34 is coupled to the electric adjustable seatpost 54 and supports the buttocks of the rider.

In the description of each embodiment, the frame of reference for terms that refer to directions such as right, rear, frontward, rearward, left, right, side, up, and down is the rider sitting on the seat 34 of the bicycle 10 and facing the handlebar 22.

The bicycle body 12 includes a front fork 12A and a frame 14. The frame 14 includes a head tube 14A, a seat tube 14B, a bottom bracket shell 14C, a down tube 14D, a chainstay 14E, a rear end 14F and a seatstay 14G. The wheels 16 include a front wheel 18 and a rear wheel 20. The front wheel 18 includes a wheel 18A and a hub axle 18B. The hub axle 18B is supported by the front fork 12A. The handlebar 22 is coupled to the head tube 14A. The rear wheel 20 includes a wheel 20A and a hub axle 20B. The wheel 20A includes a hub shell (not shown), a rear sprocket support body (not shown), spokes 20D, and a rim 20E. A one-way clutch (not shown) is located between the hub shell and the rear sprocket support body. The hub axle 20B is supported by the rear end 14F.

The cranks 24 are coupled to a bottom bracket (not shown) that is supported by the bottom bracket shell 14C. The cranks 24 include a pair of crank arms 24A, a pair of pedals 24B, a pair of pedal support shafts 24C, and a crankshaft 24D. The front sprocket 26A is coupled to the cranks 24. The rear sprocket 26B is coupled to the hub axle 20B of the rear wheel 20. The chain 28 runs around the front sprocket 26A and the rear sprocket 26B. The cranks 24 are rotated by pedaling force of the rider. Rotation of the front sprocket 26A, which is rotated together with the cranks 24, is transmitted to the rear sprocket 26B by the chain 28. This rotates the rear sprocket 26B and the rear wheel 20.

The battery 30 is coupled to the down tube 14D. The battery 30 supplies electric power to the electric assist unit 40 and the bicycle components 50. The battery 30 is connected to the electric assist unit 40 and the bicycle components 50 by electric wires (not shown).

The electric assist unit 40 includes an assist motor (not shown) and assists the rotation of the cranks 24 using the assist motor. One example of the assist motor is an electric motor. Rotation generated by the assist motor is transmitted to the front sprocket 26A by a reduction gear (not shown). In one example, a one-way clutch is located between the assist motor and the front sprocket 26A. The one-way clutch avoids transmission of the pedaling force, which is applied by the rider to the cranks 24, to the assist motor.

The operational state of the electric assist unit 40 is changed by the control device 42 or the rider. The operational state of the electric assist unit 40 includes operation modes. The operation modes include a first operation mode. If the electric assist unit 40 is in the first operation mode, the electric assist unit 40 assists traveling of the bicycle 10 at a first assist ratio. The operation modes further include a second operation mode. If the electric assist unit 40 is in the second operation mode, the electric assist unit 40 assists traveling of the bicycle 10 at a second assist ratio. The operation modes further include a third operation mode. If the electric assist unit 40 is in the third operation mode, the electric assist unit 40 assists traveling of the bicycle 10 at a third assist ratio. The operation modes further include an OFF mode. If the electric assist unit 40 is in the OFF mode, the electric assist unit 40 does not assist traveling of the bicycle 10.

The third assist ratio is greater than the first assist ratio. The third assist ratio is greater than the second assist ratio. The second assist ratio is greater than the first assist ratio. The upper limit of an output of the assist motor in the third operation mode is greater than that in the second operation mode. The upper limit of the output of the assist motor in the second operation mode is greater than that in the first operation mode.

The electric suspension 52 includes a front electric suspension 52A and a rear electric suspension 52B. The front electric suspension 52A is coupled to the front fork 12A. The rear electric suspension 52B is located between the seat tube 14B and the chainstay 14E.

The electric suspension 52 an elastic body (not shown) that absorbs a shock applied to the wheels 16 by converting the shock to elastic energy. One example of the elastic body is a cylinder that encloses a spring, air, oil and a fluid including a magnetic fluid or the like. The front electric suspension 52A supports the front wheel 18 so that the position of the front wheel 18 is changeable relative to the front fork 12A. The operational state of the front electric suspension 52A is changed, for example, by an electrically-driven actuator 52C. One example of the actuator 52C is an electric motor. The actuator 52C is driven by electric power supplied from the battery 30. The rear electric suspension 52B supports the rear wheel 20 so that the position of the rear wheel 20 is changeable relative to the seat tube 14B.

The operational state of the rear electric suspension 52B is changed, for example, by an electrically-driven actuator 52D. One example of the actuator 52D is an electric motor. The actuator 52D is driven by electric power supplied from the battery 30.

The electric adjustable seatpost 54 is supported by the seat tube 14B. The electric adjustable seatpost 54 is partially inserted into the seat tube 14B. The operational state of the electric adjustable seatpost 54 is changed by an electrically-driven actuator 54A. One example of the actuator 54A is an electric motor. The actuator 54A is driven by electric power supplied from the battery 30. The operational state of the electric adjustable seatpost 54 includes the height of the electric adjustable seatpost 54. The height of the electric adjustable seatpost 54 is changed by changing the position of the electric adjustable seatpost 54 relative to the frame 14.

The bicycle 10 includes an inclination sensor 32A. The inclination sensor 32A is attached to the frame 14 or the electric assist unit 40 to detect the pitch angle of the frame 14. The pitch angle is a rotational angle about a predetermined pitch axis that extends in the sideward direction of the bicycle 10. In one example, the inclination sensor 32A is configured to detect the angular speed of the pitch angle and calculates a value obtained by integrating the angular speed about the pitch axis as the pitch angle. The inclination sensor 32A detects the calculated pitch angle as the inclination of the bicycle 10.

The bicycle 10 includes a rotational speed sensor 32B. The rotational speed sensor 32B detects the rotational speed of the wheels 16 of the bicycle 10. The bicycle 10 includes at least one of a rotational speed sensor 32B corresponding to the front wheel 18 and a rotational speed sensor 32B corresponding to the rear wheel 20. The rotational speed sensor 32B corresponding to the front wheel 18 is coupled to the front fork 12A. The rotational speed sensor 32B corresponding to the front wheel 18 detects the rotational speed of the wheel 18A of the front wheel 18 by detecting a magnet 18C attached to the front wheel 18. The rotational speed sensor 32B corresponding to the rear wheel 20 is coupled to the chainstay 14E. The rotational speed sensor 32B corresponding to the rear wheel 20 detects the rotational speed of the wheel 20A of the rear wheel 20 by detecting a magnet 20C attached to the rear wheel 20.

The bicycle 10 includes a power meter 32C. The power meter 32C detects driving power of the bicycle 10. The driving power of the bicycle 10 can be calculated by multiplying torque applied to the cranks 24 and the rotational speed of the cranks 24. The power meter 32C includes, for example, a torque sensor (not shown) and a crank rotational speed sensor (not shown). The torque sensor outputs a signal corresponding to the torque applied to the cranks 24. The torque sensor includes, for example, a strain sensor, a magnetostriction sensor, or an optical sensor. The crank rotational speed sensor includes at least one of a sensor that detects the rotational speed of the cranks 24, a sensor that detects the rotational speed of the chain 28, and a sensor that measures the number of oscillations of the chain 28 while the front sprocket 26A is rotating.

Figure 2:
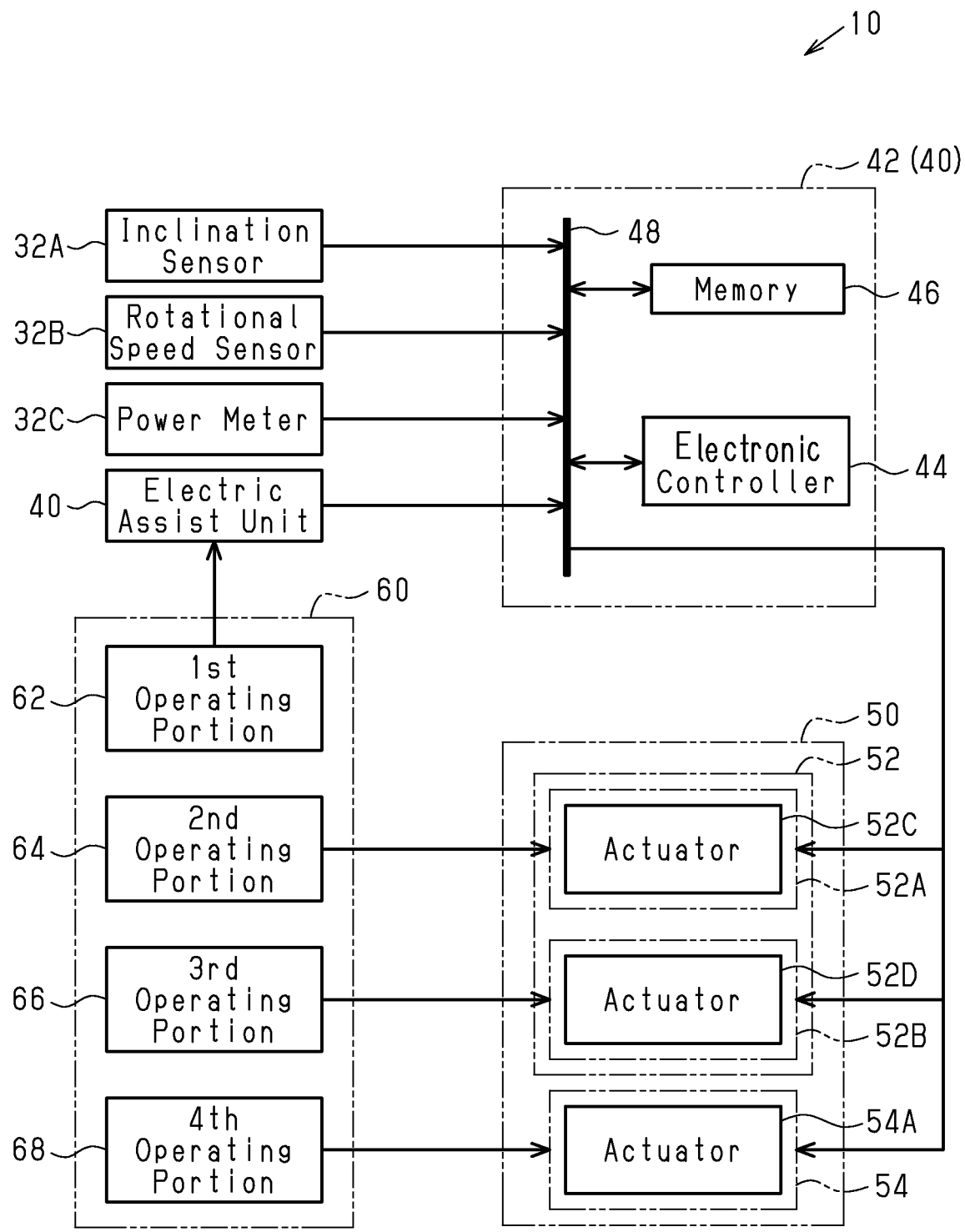
FIG. 2 is a block diagram of the bicycle components of the bicycle illustrated in FIG. 1.

As shown in FIG. 2, the bicycle 10 further includes an operating unit 60. The operating unit 60 includes a first operating portion 62, a second operating portion 64, a third operating portion 66, and a fourth operating portion 68. Each of the operating portions 62, 64, 66, 68 includes a switch (not shown) that can be operated by the rider.

The first operating portion 62 is located, for example, on the handlebar 22 (refer to FIG. 1). The first operating portion 62 is connected to the electric assist unit 40 so as to perform wired or wireless communication with the electric assist unit 40. The first operating portion 62 is configured to establish a data link so as to transmit a data set to the electric assist unit 40. The first operating portion 62 transmits the data set to the electric assist unit 40 through the established data link. The data set includes, for example, information used to control the electric assist unit 40. The rider operates the first operating portion 62 to switch the operation mode of the electric assist unit 40.

The second operating portion 64 is located, for example, on the handlebar 22. The second operating portion 64 is connected to the front electric suspension 52A so as to perform wired or wireless communication with the front electric suspension 52A. The second operating portion 64 is configured to establish a data link so as to transmit a data set to the front electric suspension 52A. The second operating portion 64 transmits the data set to the front electric suspension 52A through the established data link. The data set includes, for example, information used to control the operational state of the front electric suspension 52A.

The operational state of the electric suspension 52 includes at least one of a movement state, an amount of travel, damping force and repulsion force. In a case that the rider inputs an instruction for locking the electric suspension 52 in the movement state to the second operating portion 64, the front electric suspension 52A is operated to lock the position of the front wheel 18 relative to the front fork 12A. In a case that the rider inputs an instruction for unlocking the second operating portion 64 from the movement state, the front electric suspension 52A is operated to unlock the position of the front wheel 18 relative to the front fork 12A.

In a case that the rider inputs an instruction for increasing the amount of travel of the electric suspension 52 to the second operating portion 64, the front electric suspension 52A is operated to increase the amount of travel of the electric suspension 52. In a case that the rider inputs an instruction for decreasing the amount of travel to the second operating portion 64, the front electric suspension 52A is operated to decrease the amount of travel of the electric suspension 52.

In a case that the rider inputs an instruction for increasing the damping force of the electric suspension 52 to the second operating portion 64, the front electric suspension 52A is operated to increase the damping force of the electric suspension 52. In a case that the rider inputs an instruction for decreasing the damping force of the electric suspension 52 to the second operating portion 64, the front electric suspension 52A is operated to decrease the damping force of the electric suspension 52.

In a case that the rider inputs an instruction for increasing the repulsion force of the electric suspension 52 to the second operating portion 64, the front electric suspension 52A is operated to increase the repulsion force of the electric suspension 52. In a case that the rider inputs an instruction for decreasing the repulsion force of the electric suspension 52 to the second operating portion 64, the front electric suspension 52A is operated to decrease the repulsion force of the electric suspension 52. The repulsion force of the suspension refers to a stiffness characteristic of the electric suspension 52. For example, the repulsion force can be produced by a coil spring, an air spring, etc. that can be adjusted to change the stiffness of the suspension.

The third operating portion 66 is located, for example, on the handlebar 22. The third operating portion 66 is connected to the rear electric suspension 52B so as to perform wired or wireless communication with the rear electric suspension 52B. The third operating portion 66 is configured to establish a data link so as to transmit a data set to the rear electric suspension 52B. The third operating portion 66 transmits the data set to the rear electric suspension 52B through the established data link. The data set includes, for example, information used to control the operational state of the rear electric suspension 52B. The rear electric suspension 52B is operated in correspondence with operations performed on the third operating portion 66 in the same manner as the front electric suspension 52A is operated in correspondence with operations performed on the second operating portion 64.

The fourth operating portion 68 is located, for example, on the handlebar 22. The fourth operating portion 68 is connected to the electric adjustable seatpost 54 so as to perform wired or wireless communication with the electric adjustable seatpost 54. The fourth operating portion 68 is configured to establish a data link so as to transmit a data set to the electric adjustable seatpost 54. The fourth operating portion 68 transmits the data set to the electric adjustable seatpost 54 through the established data link. The data set includes, for example, information used to control the operational state of the electric adjustable seatpost 54.

In a case that the rider inputs a seat raising instruction to the fourth operating portion 68, the electric adjustable seatpost 54 is operated to raise the position of the electric adjustable seatpost 54 relative to the frame 14. In a case that the rider inputs a seat lowering instruction to the fourth operating portion 68, the electric adjustable seatpost 54 is operated to lower the position of the electric adjustable seatpost 54 relative to the frame 14.

The control device 42 includes an electronic controller 44 (hereinafter referred to as "the controller 44"). The controller 44 includes one or more processors. The control device 42 includes memory 46 and a bus 48. The memory 46 can be any computer storage device 22 that is a non-transitory computer readable medium such as a ROM (Read Only Memory) device, a RAM (Random Access Memory) device, a hard disk, a flash drive, etc. The memory 46 stores information that is needed for the operation of the control device 42 such as the operation mode of the electric assist unit 40. In a first example, the controller 44 and the memory 46, each of which is a semiconductor chip, are mounted on a board (not shown) included in the control device 42. In a second example, the control device 42 is a semiconductor chip, and the controller 44 and the memory 46 are each a module occupying a section of the semiconductor chip. The controller 44 and the memory 46 are electrically connected by the bus 48. In one example, the bus 48 is a PCI-Express bus.

The electric assist unit 40, the operating unit 60, the inclination sensor 32A, the rotational speed sensor 32B and the power meter 32C are connected to the bus 48 of the control device 42. The electric assist unit 40, the operating unit 60, the inclination sensor 32A, the rotational speed sensor 32B and the power meter 32C are each configured to perform wired or wireless communication with the bus 48 of the control device 42, are each configured to establish a data link with the controller 44.

The controller 44 is programmed to control the operational states of each of the bicycle components 50 based on at least the operational state of the electric assist unit 40. In a first example, the controller 44 is configured to control the operational state of the electric suspension 52. In this case, the controller 44 is configured to control at least one of the movement state, the amount of travel, the damping force and the repulsion force of the electric suspension 52 based on the operational state of the electric assist unit 40. In a second example, the controller 44 is configured to control the operational state of the electric adjustable seatpost 54. Adjustable ranges of the height of the electric adjustable seatpost 54 include at least a first range and a second range. The second range is higher than the first range. In one example, the adjustable ranges of the height of the electric adjustable seatpost 54 further include a third range. The third range is lower than the first range. The controller 44 controls the height of the electric adjustable seatpost 54 based on the operational state of the electric assist unit 40.

The controller 44 has an automatic control mode and a manual control mode. The controller 44 is configured to switch between the automatic control mode and the manual control mode based on an input from a switch of the operating unit 60. In the automatic control mode, the controller 44 is configured to control the operational states of each bicycle components 50 based on at least the operational state of the bicycle electric assist unit 40. In the manual control mode, the operational states of the bicycle components 50 are controlled based on an operation performed on the operating unit 60 by the rider.

FIG. 3 shows one example of a first map specifying the relationship between the operation mode of the electric assist unit 40 and the operational state of the electric suspension 52. In FIG. 3, any control can be selected for items corresponding to the boxes that are crossed out. The controller 44 stores the first map in advance in the memory 46. The controller 44 controls the operational state of the electric suspension 52 based on the operation mode of the electric assist unit 40.

The controller 44 controls the electric suspension 52 so that the movement state of the electric suspension 52 becomes a locked state in a state where the electric assist unit 40 is in the first operation mode. If the operation mode is the first operation mode, the assist ratio of the electric assist unit 40 is small. Thus, it is assumed that the rider is riding the bicycle 10 on a level road. This control allows the rider to take a stable stance while riding the bicycle 10 on a level road.

The controller 44 controls the electric suspension 52 so that the movement state of the electric suspension 52 becomes an unlocked state in a state where the electric assist unit 40 is in the second operation mode. In a case in which the operation mode is the second operation mode, the assist ratio of the electric assist unit 40 is greater than a case in which the operation mode is the first operation mode. Thus, it is assumed that the rider is riding the bicycle 10 on rough terrain. In this control, while the rider is riding the bicycle 10 on rough terrain, shocks acting on the bicycle 10 are absorbed by the electric suspension 52.

The controller 44 executes a first control process that controls the front electric suspension 52A and the rear electric suspension 52B in a state where the electric assist unit 40 is in the third operation mode. In one example, the first control process includes control processes A1 to A6. In a case in which the operation mode is the third operation mode, the assist ratio of the electric assist unit 40 is greater than a case in which the operation mode is the second operation mode. Thus, it is assumed that the rider is riding the bicycle 10 on an uphill slope.

In the control process A1, the controller 44 controls at least one of the front electric suspension 52A and the rear electric suspension 52B to change the amount of travel. While the rider is riding the bicycle 10 on an uphill slope, this control allows the rider to take a riding stance appropriate for an uphill slope.

In the control process A2, the controller 44 controls at least one of the front electric suspension 52A and the rear electric suspension 52B so that the amount of travel of the rear electric suspension 52B is larger than the amount of travel of the front electric suspension 52A. This allows the rider to easily take a forward leaning stance and reduces the load on the rider while riding the bicycle on the uphill slope.

In the control process A3, the controller 44 controls the rear electric suspension 52B and the front electric suspension 52A so that the movement states of the rear electric suspension 52B and the front electric suspension 52A become a locked state. If riding on an uphill slope, pedaling force of the rider and assist power of the electric assist unit 40 are large. Thus, the movement state of the electric suspension 52 is the locked state so that a vertical movement of the bicycle body 12 is limited if the pedaling force of the rider is applied. This allows the rider to take a stable riding stance.

In the control process A4, the controller 44 controls at least one of the front electric suspension 52A and the rear electric suspension 52B to control the repulsion force. The front electric suspension 52A and the rear electric suspension 52B are contracted by the weight of the rider. The inclination of the bicycle body 12 can be changed by changing the repulsion force of the front electric suspension 52A and the rear electric suspension 52B. This allows the rider to take a riding stance that is appropriate for an uphill slope.

In the control process A5, the controller 44 controls at least one of the front electric suspension 52A and the rear electric suspension 52B so that the repulsion force of the rear electric suspension 52B is greater than the repulsion force of the front electric suspension 52A. Thus, the rear electric suspension 52B is contracted over a shorter length than the front electric suspension 52A. This allows the rider to easily take a forward leaning stance and reduces the load on the rider while riding the bicycle on an uphill slope.

In the control process A6, the controller 44 controls the electric suspension 52 so that the movement states of the electric suspension 52 become the unlocked state. Thus, the rider can comfortably ride the bicycle on uphill and rough terrain.

If the electric assist unit 40 is in the OFF mode, then the controller 44 executes a second control that controls the front electric suspension 52A and the rear electric suspension 52B. In one example, the second control includes controls B1 to B3. If the operation mode is the OFF mode, it is assumed that the rider is riding the bicycle 10 on a downhill slope.

In the control process B1, the controller 44 controls at least one of the front electric suspension 52A and the rear electric suspension 52B so that the amount of travel of the rear electric suspension 52B is smaller than the amount of travel of the front electric suspension 52A. This allows the rider to easily take a rearward leaning stance and reduces the load on the rider while riding the bicycle on the downhill slope.

In the control process B2, the controller 44 controls the rear electric suspension 52B and the front electric suspension 52A so that the movement states of the rear electric suspension 52B and the front electric suspension 52A become an unlocked state. Because the bicycle 10 travels on a downhill slope fast, the bicycle body 12 tends to receive a larger shock from the surface of the ground. The electric suspension 52 absorbs the shock received from the surface of the ground. Thus, the rider can ride the bicycle comfortably.

In the control process B3, the controller 44 controls at least one of the front electric suspension 52A and the rear electric suspension 52B so that the repulsion force of the rear electric suspension 52B is smaller than the repulsion force of the front electric suspension 52A. Thus, the rear electric suspension 52B is contracted over a longer length than the front electric suspension 52A. This allows the rider to easily take a rearward leaning stance and reduces the load on the rider while riding the bicycle on a downhill slope.

FIG. 4 shows an example of a second map specifying the relationship between the operation mode of the electric assist unit 40 and the operational state of the electric adjustable seatpost 54. The controller 44 stores the second map in advance in the memory 46. The controller 44 controls the operational state of the electric adjustable seatpost 54 based on the operation mode.

If the operation mode is the first operation mode, the controller 44 controls the electric adjustable seatpost 54 so that the height of the electric adjustable seatpost 54 is included in the first range. Thus, the rider can take a stance that allows for easy pedaling while riding the bicycle on a level road.

If the operation mode is the second operation mode, the controller 44 controls the electric adjustable seatpost 54 so that the height of the electric adjustable seatpost 54 is included in the first range. Thus, the rider can take a stance that allows for easy pedaling while riding the bicycle on a rough terrain.

The controller 44 controls the electric adjustable seatpost 54 so that the height of the electric adjustable seatpost 54 is included in the second range in a state where the operation mode is the third operation mode. The higher position of the electric adjustable seatpost 54 allows the rider to easily take a forward leaning stance. This reduces the load on the rider while riding the bicycle on an uphill slope.

If the operation mode is the OFF mode, the controller 44 controls the electric adjustable seatpost 54 so that the height of the electric adjustable seatpost 54 is included in the third range. The lower position of the electric adjustable seatpost 54 allows the rider to easily take a rearward leaning stance. This reduces the load on the rider while riding the bicycle on a downhill slope.

The controller 44 controls the operational states of each of the bicycle components 50 based on the operation mode of the electric assist unit 40 and at least one of the detection result of the inclination sensor 32A, the detection result of the power meter 32C, and the detection result of the rotational speed sensor 32B. In this control, the detection result of the inclination sensor 32A is used to determine whether the rider is riding the bicycle 10 on an uphill slope or a downhill slope. Additionally, the detection result of the rotational speed sensor 32B is used to determine whether or not the rider is riding the bicycle 10 on a downhill slope. Further, the detection result of the power meter 32C is used to determine whether or not the rider is riding the bicycle 10 on an uphill slope. This allows the bicycle components 50 to be further specifically controlled.

Second Embodiment

The structure of a second embodiment of a bicycle 10 differs from the structure of the first embodiment of the bicycle 10 in the points described below but otherwise is substantially the same as the structure of the first embodiment of the bicycle 10.

Figure 5:
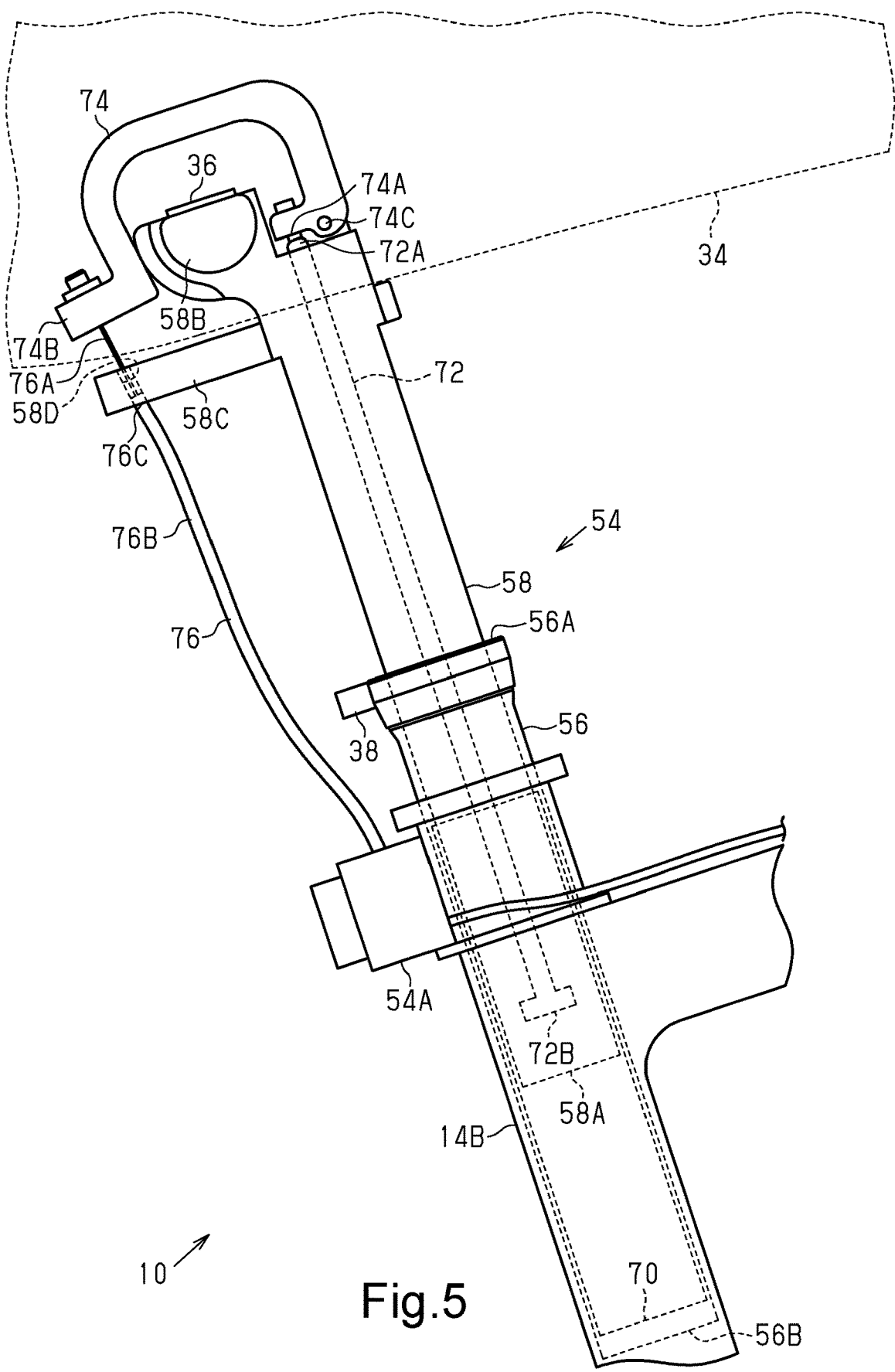
FIG. 5 is an enlarged side elevational view of an electric adjustable seatpost as viewed from the right side of a bicycle in accordance with a second embodiment.

As shown in FIG. 5, the actuator 54A is fixed to a seat tube 14B. The configuration for fixing the actuator 54A includes, for example, a first configuration and a second configuration, which will now be described. In the first configuration, the actuator 54A is located outside the seat tube 14B and fixed to an outer portion of the seat tube 14B as shown in the drawings. In the second configuration, the actuator 54A is located in the seat tube 14B and fixed to an inner portion of the seat tube 14B. The electric adjustable seatpost 54 includes a stationary tube 56, a movable tube 58 and a biasing mechanism 70. The seat 34 is coupled to the movable tube 58. The movable tube 58 includes a first end 58A and a second end 58B. The second end 58B is opposite to the first end 58A. The first end 58A is located closer to the seat tube 14B than the second end 58B. The seat 34 is coupled, for example, to the second end 58B of the movable tube 58.

The bicycle 10 further includes a load sensor 36 and a position sensor 38. The load sensor 36 detects force applied to the movable tube 58. The load sensor 36 is arranged, for example, on the second end 58B of the movable tube 58. The load sensor 36 is connected to the control device 42 to perform wired communication or wireless communication with the control device 42. The detection result of the load sensor 36 is transmitted to the control device 42. The position sensor 38 detects the height of the electric adjustable seatpost 54. The height of the electric adjustable seatpost 54 is, for example, the position of the seat 34 relative to the seat tube 14B in an axial direction that extends along the axis of the seat tube 14B. The position sensor 38 is arranged, for example, on the stationary tube 56. The position sensor 38 is connected to the control device 42 to perform wired communication or wireless communication with the control device 42. The detection result of the position sensor 38 is transmitted to the control device 42.

The movable tube 58 is configured to be movable relative to the stationary tube 56 in the axial direction extending along the axis of the stationary tube 56. The first end 58A of the movable tube 58 is inserted into the stationary tube 56. The stationary tube 56 includes a first end 56A, which is located closer to the movable tube 58, and a second end 56B, which is opposite to the first end 56A. The second end 56B of the stationary tube 56 is inserted into the seat tube 14B. The stationary tube 56 is fixed to the seat tube 14B. The operational state of the electric adjustable seatpost 54 includes a fixed state and a movable state. The fixed state is a state in which the movable tube 58 is fixed to the stationary tube 56. The movable state is a state in which the movable tube 58 is movable relative to the stationary tube 56.

In one example, the electric adjustable seatpost 54 further includes a support portion 58C. The support portion 58C is arranged on an outer portion of the movable tube 58. The support portion 58C is formed separately from the movable tube 58 and fixed to the outer portion of the movable tube 58. Alternatively, the support portion 58C can be formed integrally with the movable tube 58.

The biasing mechanism 70 is located in the stationary tube 56 at a lower position of the stationary tube 56 in the axial direction extending along the axis of the stationary tube 56. The biasing mechanism 70 biases the movable tube 58 relative to the stationary tube 56 in the extension direction and fixes the movable tube 58 to any position. Preferably, the biasing mechanism 70 biases the movable tube 58 with at least one of air pressure or hydraulic pressure. Since the movable tube 58 use a general biasing process, the biasing process will not be described in detail. The actuator 54A can be located in the seat tube 14B and fixed to the inner portion of the seat tube 14B.

The electric adjustable seatpost 54 includes a push rod 72, a pressing member 74 and a cable 76. The push rod 72 includes a first end 72A and a second end 72B, which is opposite to the first end 72A. The push rod 72 is located in the movable tube 58. The first end 72A of the push rod 72 is located at a higher position than the second end 72B in the axial direction extending along the axis of the stationary tube 56. The second end 72B of the push rod 72 is located in the biasing mechanism 70. The push rod 72 is movable in the axial direction extending along the axis of the stationary tube 56. In a state in which the first end 72A of the push rod 72 is pushed, the operational state of the electric adjustable seatpost 54 is the movable state. In a state in which the first end 72A of the push rod 72 is not pushed, the operational state of the electric adjustable seatpost 54 is the fixed state.

The pressing member 74 includes a first end 74A, a second end 74B and a pin 74C. The pressing member 74 is coupled to the movable tube 58 so as to be rotatable about the axis of the pin 74C. The first end 74A is in contact with the first end 72A of the push rod 72. The second end 74B is connected to the cable 76.

The cable 76 is a Bowden cable and includes an inner cable 76A and an outer casing 76B. The support portion 58C of the movable tube 58 includes a hole 58D. The inner cable 76A extends through the hole 58D and connects the actuator 54A and the second end 74B of the pressing member 74. The outer casing 76B includes an end 76C supported by the support portion 58C of the movable tube 58. The outer casing 76B covers the inner cable 76A.

The operation of the pressing member 74 will now be described. In a case in which the actuator 54A pulls the inner cable 76A, the pressing member 74 is rotated in the counterclockwise direction about the axis of the pin 74C as viewed from the right side of the bicycle 10. The first end 74A is moved to press the first end 72A of the push rod 72. Consequently, the operational state of the electric adjustable seatpost 54 becomes the movable state. In the movable state, if the seat 34 receives force that is greater than the force of the biasing mechanism 70 biasing the movable tube 58, the movable tube 58 is moved downwardly. If the seat 34 does not receive force that is greater than the force of the biasing mechanism 70 biasing the movable tube 58, then the movable tube 58 is moved upwardly.

If the actuator 54A releases the inner cable 76A from the pulling operation, then the pressing member 74 is rotated in the clockwise direction about the axis of the pin 74C as viewed from the right side of the bicycle 10. The first end 74A stops pressing the first end 72A of the push rod 72. Consequently, the operational state of the electric adjustable seatpost 54 becomes the fixed state, and the position of the movable tube 58 is fixed.

Figure 6:
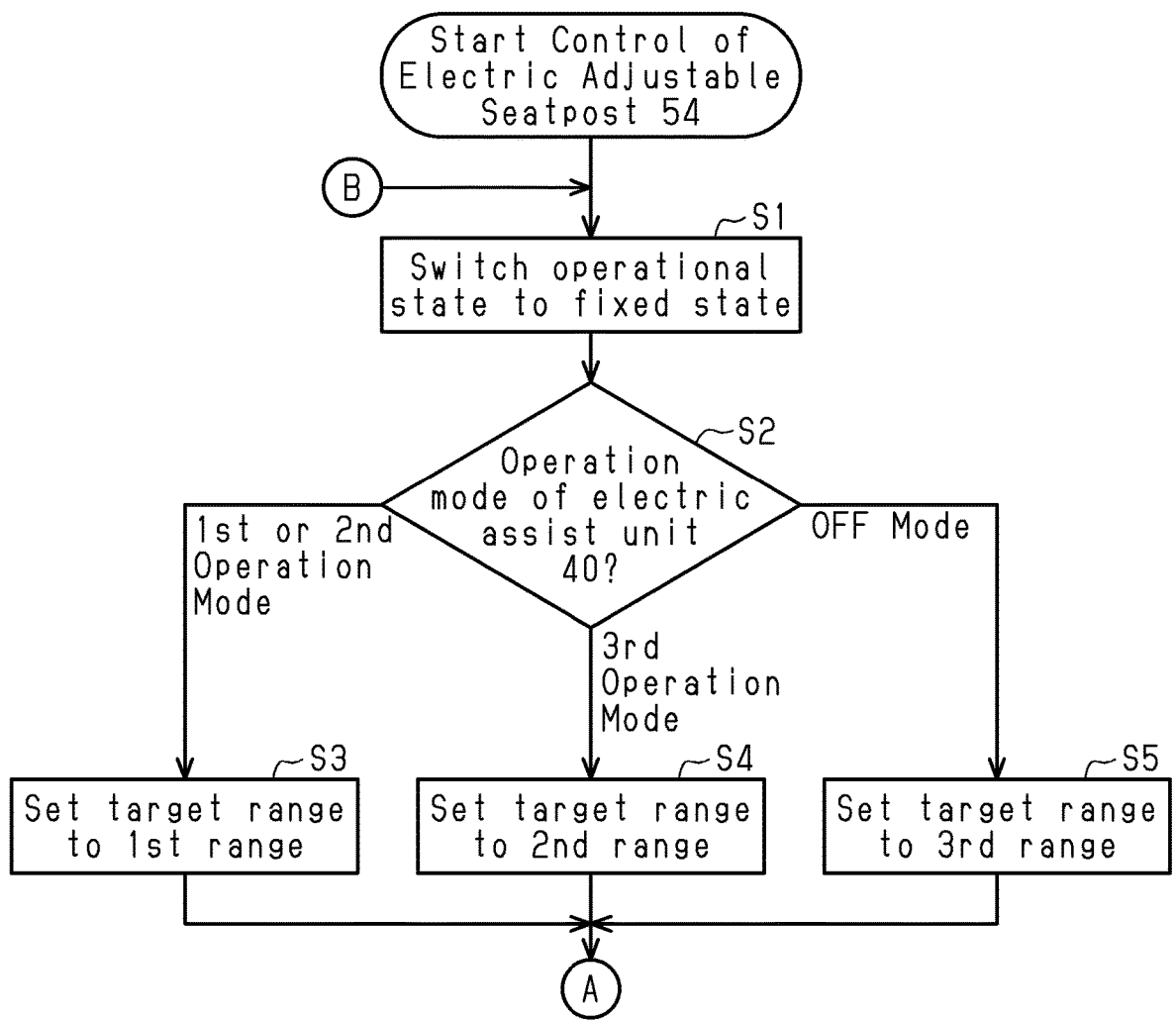
FIG. 6 is a first portion of a flowchart showing a control process executed by the electronic controller to change a height of the electric adjustable seatpost.
Figure 7:
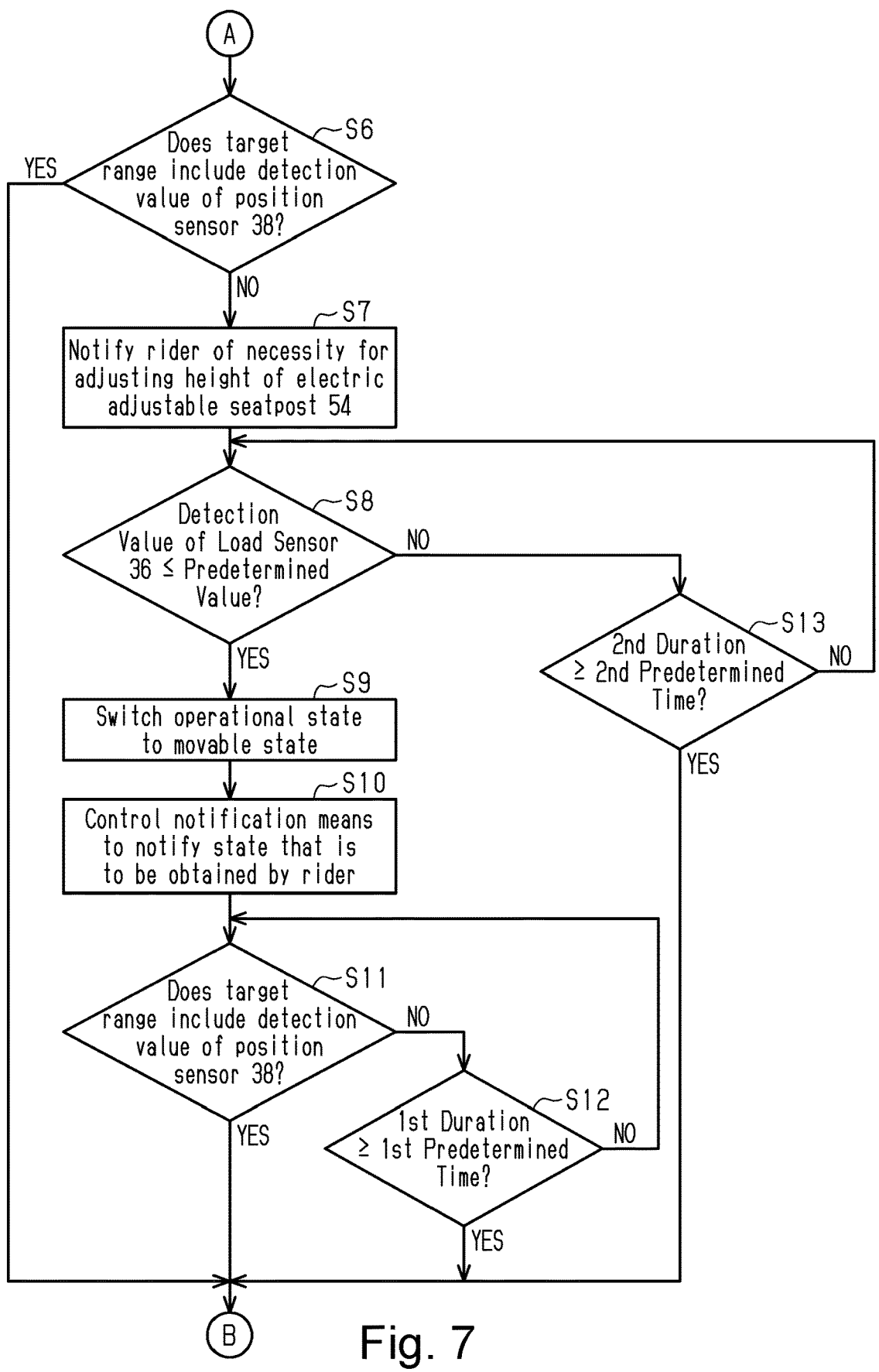
FIG. 7 is a second portion of a flowchart showing a control process executed by the electronic controller to change a height of the electric adjustable seatpost.

The control performed by the controller 44 on the electric adjustable seatpost 54 will now be described with reference to FIGS. 6 and 7. In a state in which the control device 42 is switched to activation, the controller 44 starts to control the electric adjustable seatpost 54. If the control device 42 is switched to deactivation while the controller 44 is executing the control, then the controller 44 terminates the control that is being executed.

In step S1, the controller 44 switches the operational state of the electric adjustable seatpost 54 to the fixed state. More specifically, the controller 44 transmits a first signal, which contains an instruction for releasing the inner cable 76A from the pulling operation, to the actuator 54A. If the actuator 54A receives the first signal, then the actuator 54A releases the inner cable 76A from the pulling operation. Thus, the operational state of the electric adjustable seatpost 54 becomes the fixed state.

In step S2, the controller 44 determines the kind of the operation mode of the electric assist unit 40, which is stored in the memory 46. If the controller 44 determines that the operation mode of the electric assist unit 40 is the first operation mode or the second operation mode in step S2, the controller 44 executes step S3. If the controller 44 determines that the operation mode of the electric assist unit 40 is the third operation mode in step S2, then the controller 44 executes step S4. If the controller 44 determines that the operation mode of the electric assist unit 40 is the OFF mode in step S2, then the controller 44 executes step S5.

In step S3, the controller 44 stores the first range, which is stored in the memory 46, in the memory 46 as a target range used for control.

In step S4, the controller 44 stores the second range, which is stored in the memory 46, in the memory 46 as the target range used for control.

In step S5, the controller 44 stores the third range, which is stored in the memory 46, in the memory 46 as the target range used for control.

In step S6, the controller 44 determines whether or not the target range includes a value detected by the position sensor 38. If the controller 44 determines that the target range includes the detection value of the position sensor 38 in step S6, then the controller 44 executes step S1.

If the controller 44 determines that the target range does not include the detection value of the position sensor 38 in step S6, then the controller 44 executes step S7. In step S7, the controller outputs notification information that notifies the rider of the necessity for adjusting the height of the electric adjustable seatpost 54 with a notification means. The notification information includes, for example, at least one of visual information, audial information, and tactile information. The notification means includes at least one of a display, a speaker, and a vibration device. In one example, the display and the speaker are included in a cyclometer. The vibration device is included in the seat 34 or the handlebar 22. Additionally, the controller 44 starts to count the time in which a value detected by the load sensor 36 continues to be greater than a predetermined value (hereafter, referred to as "the second duration").

In step S8, the controller 44 determines whether or not the detection value of the load sensor 36 is less than or equal to the predetermined value. The detection value of the load sensor 36 is an amount of force applied to the movable tube 58. The memory 46 stores the predetermined value related to loads in advance. If the controller 44 determines that the force applied to the movable tube 58 is greater than the predetermined value, then the controller 44 executes step S13. If the controller 44 determines that the force applied to the movable tube 58 is less than or equal to the predetermined value, then the controller 44 resets the count of the second duration and executes step S9.

In step S9, the controller 44 switches the operational state of the electric adjustable seatpost 54 to the movable state. More specifically, the controller 44 transmits a second signal, which contains an instruction for performing the pulling operation of the inner cable 76A, to the actuator 54A. If the actuator 54A receives the second signal from the controller 44, then the actuator 54A pulls the inner cable 76A. Consequently, the operational state of the electric adjustable seatpost 54 is set to the movable state. As shown in steps S1 and S9, the controller 44 switches the operational state of the electric adjustable seatpost 54 based on the operation mode.

In step S10, the controller 44 controls the notification means to notify a state that is to be obtained by the rider in order to set the height of the electric adjustable seatpost 54 in the target range. Step S10 includes, for example, the processes described below. If the present height of the electric adjustable seatpost 54 is determined to be greater than the upper limit of the target range, then the controller 44 operates the notification means to provide the rider with information that prompts the rider to apply a load to the seat 34. If the present height of the electric adjustable seatpost 54 is determined to be less than the lower limit of the target range, then the controller 44 operates the notification means to provide the rider with information that prompts the rider to reduce the load to the seat 34. Additionally, the controller 44 starts to count the time in which the detection value of the position sensor 38 continues to be out of the target range (hereafter, referred to as "the first duration").

In step S11, the controller 44 determines whether or not the target range includes the detection value of the position sensor 38. If the controller 44 determines that the target range includes the detection value of the position sensor 38 in step S11, then the controller 44 resets the count of the first duration and executes step S1.

If the controller 44 determines that the target range does not include the detection value of the position sensor 38 in step S11, then the controller 44 executes step S12. In step S12, the controller 44 determines whether or not the first duration is greater than or equal to a first predetermined time. The memory 46 stores the first predetermined time.

If the controller 44 determines that the first duration is less than the first predetermined time in step S12, the controller 44 executes step S11. If the controller 44 determines that the first duration is greater than or equal to the first predetermined time in step S12, then the controller 44 resets the count of the first duration and executes step S1.

In step S13, the controller 44 determines whether or not the second duration is greater than or equal to a second predetermined time. The memory 46 stores the second predetermined time. If the controller 44 determines that the second duration is less than the second predetermined time in step S13, the controller 44 executes step S8. If the controller 44 determines that the second duration is greater than or equal to the second predetermined time in step S13, then the controller 44 resets the count of the second duration and executes step S1.

Modified Examples

The above description illustrates embodiments of a bicycle control device and a bicycle electric assist unit according to the present invention and is not intended to be restrictive. The embodiments of the bicycle control device and the bicycle electric assist unit according to the present invention can be modified, for example, as follows. Further, two or more of the embodiments and modified examples can be combined.

In the first and second embodiments, the controller 44 can control the electric suspension 52 based on pedaling information and rotation information. The pedaling information is related to driving power that is transmitted in a driving power transmission path extending from the pedals 24B to the rear wheel 20. More specifically, the pedaling information is related to driving power applied to the crank arms 24A, the pedals 24B, the pedal support shafts 24C, the crankshaft 24D, the bottom bracket, the front sprocket 26A, the rear sprocket 26B, the chain 28, the hub shell, the rear sprocket support body, the one-way clutch, the spokes 20D and the rim 20E. The rotation information is related to rotation of the pedals 24B, the crank arms 24A, the bottom bracket, the front sprocket 26A, the rear sprocket 26B, the hub shell, the pulley of the rear derailleur and the chain 28. Controlling of the electric suspension 52 based on the pedaling information and the rotation information allows the rider to efficiently pedal.

Figure 8:
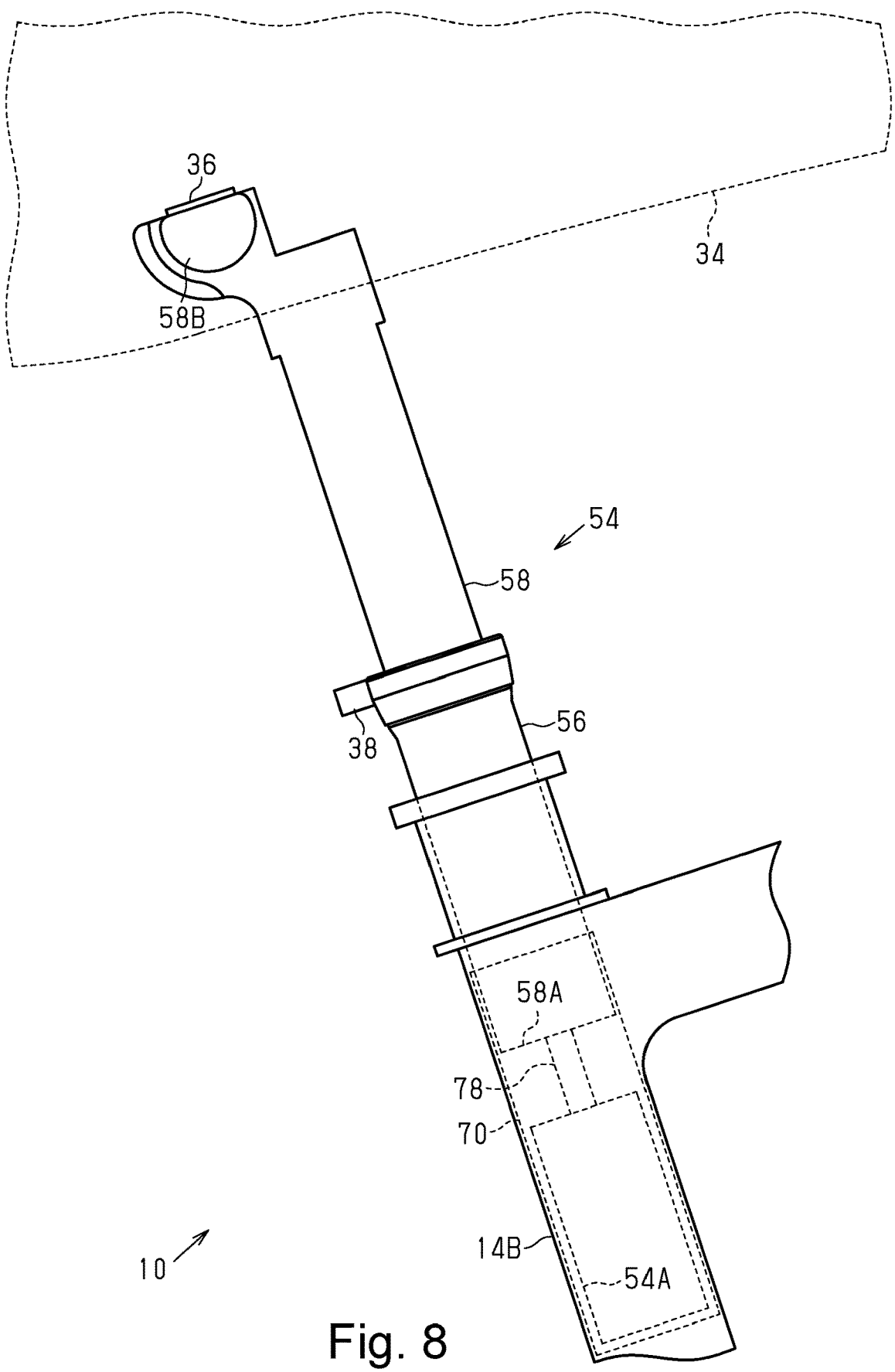
FIG. 8 is an enlarged view side elevational view of a modified example of an electric adjustable seatpost.

In the second embodiment, the actuator 54A can be arranged at any position. For example, FIG. 8 shows a modified example of the actuator 54A that is arranged in the seat tube 14B. In this modified example, the actuator 54A is a liquid pump and uses hydraulic pressure to upwardly move the movable tube 58 in the axial direction extending along the axis of the stationary tube 56.

The biasing mechanism 70 includes the actuator 54A and a tubular member 78. The biasing mechanism 70 is located at a lower position of the stationary tube 56 in the axial direction extending along the axis of the stationary tube 56. The tubular member 78 connects the lower end of the stationary tube 56 and the actuator 54A. At least one of the actuator 54A, the tubular member 78 and the stationary tube 56 includes a valve (not shown) that restricts the flow of oil between the actuator 54A and the stationary tube 56. If the valve opens, then the oil flows between the actuator 54A and the stationary tube 56. If the valve closes, then the oil does not flow between the actuator 54A and the stationary tube 56.

The movable tube 58 also accommodates a piston (not shown). If the oil is provided from the lower end of the stationary tube 56 through the tubular member 78, pressure is applied to the piston. The pressure raises the movable tube 58.

The second embodiment can further include a device that allows for manual switching between the movable state and the fixed state of the electric adjustable seatpost 54. In this case, the rider can adjust the electric adjustable seatpost 54 to any height.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
an electronic controller that controls an operational state of a bicycle component based on at least an operational state of a bicycle electric assist unit having an assist motor configured to assist propulsion of a bicycle, the operational state being based on a first assist ratio of the assist motor and a second assist ratio of the assist motor, the second assist ratio being greater than the first assist ratio,
the bicycle component including at least one of an electric suspension and an electric adjustable seatpost.

2. The bicycle control device according to claim 1, wherein
the electronic controller is configured to function in an automatic control mode and a manual control mode, and
in the automatic control mode, the electronic controller controls the operational state of the bicycle component based on at least the operational state of the bicycle electric assist unit.

3. The bicycle control device according to claim 2, wherein
the electronic controller is configured to switch between the automatic control mode and the manual control mode based on an input from an operating unit.

4. The bicycle control device according to claim 1, wherein
the bicycle component includes the electric suspension, and
the electronic controller is configured to control the operational state of the electric suspension.

5. The bicycle control device according to claim 4, wherein
the operational state of the electric suspension includes at least one of a movement state, an amount of travel, damping force and repulsion force, and
the electronic controller is configured to control at least one of the movement state, the amount of travel, the damping force and the repulsion force based on the operational state of the bicycle electric assist unit.

6. The bicycle control device according to claim 4, wherein
the operational state of the bicycle electric assist unit includes an operation mode, and
the electronic controller is configured to control the operational state of the electric suspension based on the operation mode.

7. The bicycle control device according to claim 6, wherein
the operation mode includes a first operation mode that assists traveling of a bicycle at the first assist ratio, and
the electronic controller is configured to control the electric suspension so that the movement state of the electric suspension becomes a locked state in a state where the operation mode is the first operation mode.

8. The bicycle control device according to claim 7, wherein
the operation mode includes a second operation mode that assists traveling of the bicycle at the second assist ratio, and
the electronic controller is configured to control the electric suspension so that the movement state of the electric suspension becomes an unlocked state in a state where the operation mode is the second operation mode.

9. The bicycle control device according to claim 8, wherein
the electric suspension includes a front electric suspension and a rear electric suspension,
the operation mode includes a third operation mode that assists traveling of the bicycle at a third assist ratio, and
the electronic controller is configured to control the front electric suspension and the rear electric suspension in a state where the operation mode of the bicycle electric assist unit is the third operation mode.

10. The bicycle control device according to claim 9, wherein
the third assist ratio is greater than the first assist ratio.

11. The bicycle control device according to claim 10, wherein
the third assist ratio is greater than the second assist ratio.

12. The bicycle control device according to claim 9, wherein
the electronic controller is configured to control at least one of the front electric suspension and the rear electric suspension to change an amount of travel.

13. The bicycle control device according to claim 12, wherein
the electronic controller is configured to control at least one of the front electric suspension and the rear electric suspension so that the amount of travel of the rear electric suspension is larger than the amount of travel of the front electric suspension.

14. The bicycle control device according to claim 12, wherein
the electronic controller is configured to control the front electric suspension and the rear electric suspension so that movement states of the front electric suspension and the rear electric suspension are changed to a locked state.

15. The bicycle control device according to claim 9, wherein
the electronic controller is configured to control at least one of the front electric suspension and the rear electric suspension to change repulsion force.

16. The bicycle control device according to claim 15, wherein
the electronic controller is configured to control at least one of the front electric suspension and the rear electric suspension so that the repulsion force of the rear electric suspension is larger than the repulsion force of the front electric suspension.

17. The bicycle control device according to claim 15, wherein
the electronic controller controls the electric suspension so that the movement state of the electric suspension becomes an unlocked state.

18. The bicycle control device according to claim 1, wherein
the bicycle component includes the electric adjustable seatpost, and
the electronic controller controls the operational state of the electric adjustable seatpost.

19. The bicycle control device according to claim 18, wherein
the operational state of the electric adjustable seatpost includes a height of the electric adjustable seatpost, and
the electronic controller is configured to control the height of the electric adjustable seatpost based on the operational state of the bicycle electric assist unit.

20. The bicycle control device according to claim 18, wherein
the operational state of the bicycle electric assist unit includes an operation mode, and
the electronic controller is configured to control the operational state of the electric adjustable seatpost based on the operation mode.

21. The bicycle control device according to claim 20, wherein
the operation mode includes a first operation mode that assists traveling of a bicycle at the first assist ratio and a third operation mode that assists traveling of the bicycle at a third assist ratio that is greater than the first assist ratio,
the electronic controller is configured to control the electric adjustable seatpost so that a height of the electric adjustable seatpost is included in a first range in a state where the operation mode is the first operation mode, and
the electronic controller is configured to control the electric adjustable seatpost so that the height of the electric adjustable seatpost is included in a second range that is higher than the first range in a state where the operation mode is the third operation mode.

22. The bicycle control device according to claim 21, wherein
the operation mode includes a second operation mode that assists traveling of the bicycle at the second assist ratio,
the second assist ratio is less than the third assist ratio,
the electronic controller is configured to control the electric adjustable seatpost so that the height of the electric adjustable seatpost is included in the first range in a state where the operation mode is the second operation mode.

23. The bicycle control device according to claim 20, wherein
the electric adjustable seatpost includes a stationary tube, a movable tube to which a seat is coupled, and a biasing mechanism that biases the movable tube relative to the stationary tube in an extension direction and fixes the movable tube to any position,
the operational state of the electric adjustable seatpost includes a fixed state in which the movable tube is fixed to the stationary tube and a movable state in which the movable tube is movable relative to the stationary tube, and
the electronic controller is configured to switch the operational state of the electric adjustable seatpost based on the operation mode.

24. The bicycle control device according to claim 23, wherein
the biasing mechanism biases the movable tube with at least one of air pressure and hydraulic pressure.

25. The bicycle control device according to claim 23, wherein
the controller is configured to switch the operational state of the electric adjustable seatpost to the movable state in a state where the controller determines that force applied to the movable tube is less than or equal to a predetermined value.

26. The bicycle control device according to claim 1, wherein
the electronic controller is configured to control the operational state of the bicycle component based on an operation mode of the bicycle electric assist unit and at least one of a detection result of an inclination sensor that detects an inclination of a bicycle, a detection result of a power meter that detects drive power of the bicycle, and a detection result of a rotational speed sensor that detects a rotational speed of a wheel of the bicycle.

27. A bicycle electric assist unit comprising:
the bicycle control device according to claim 1.

* * * * *